Sept. 29, 1942.    P. BURGER    2,297,390
SPLINED CONNECTION
Filed Jan. 16, 1940    2 Sheets-Sheet 1

INVENTOR:
PETER BURGER
by
ATTORNEYS

Sept. 29, 1942.  P. BURGER  2,297,390
SPLINED CONNECTION
Filed Jan. 16, 1940  2 Sheets-Sheet 2

INVENTOR:
PETER BURGER
by
ATTORNEYS

Patented Sept. 29, 1942

2,297,390

UNITED STATES PATENT OFFICE 2,297,390

SPLINED CONNECTION

Peter Burger, Munich, Germany; vested in the Alien Property Custodian

Application January 16, 1940, Serial No. 314,119
In Germany January 18, 1939

3 Claims. (Cl. 287—119)

The invention relates to improvements in splined connections of the type in which the tooth cross section diminishes toward the end of the shaft or shaft receiving member.

It is an object of the invention to provide improved splined connections especially adapted for transmitting torque and at the same time transmitting stresses in an axial direction as in the case of propeller driving shafts.

It is another object to provide such splined connections which may be made small and light as required by aircraft service while at the same time giving maximum strength and reliability.

Another object is to provide such splined connections having a high degree of co-axiality.

Another object of the present invention is to provide a splined connection in which the leading and following faces of the teeth incline forwardly but at different angles so that the width of the tooth decreases toward the end of the shaft or shaft receiving member.

Another object of the invention is to provide such splined connections in which the lead angles of those faces of the splines which are not loaded in normal operation increase in a direction toward the end of the shaft.

Another object is to so construct the spline keys that they are trapezoidal in a cross-section taken at right angles to the axis of the shaft whereby the shaft automatically centers itself with respect to the shaft receiving member.

Further objects and advantages of this invention will be apparent from consideration of the specification as illustrated by the accompanying drawings of possible embodiments of the invention, in which drawings.

Figure 1:
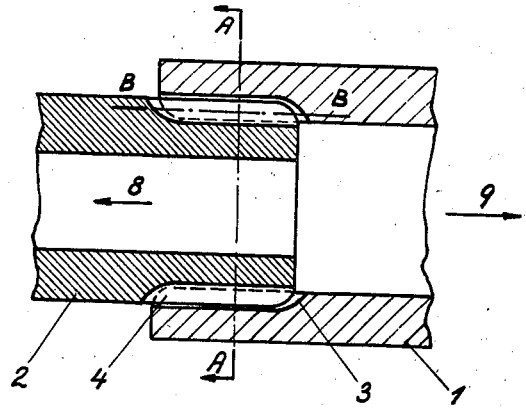
Fig. 1 is a longitudinal section through two shafts positively connected together by a splined connection embodying the invention.
Figure 2:
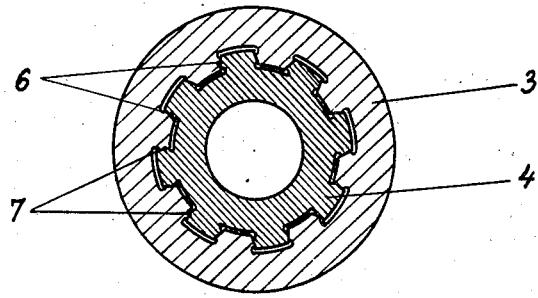
Fig. 2 is a cross-section through the shafts along the line A—A of Fig. 1.

Referring to said drawings, the shafts 1 and 2 are positively connected together by the internal toothing 3 on the shaft receiving member 1 cooperating with the external toothing or splines 4 on the shaft member 2. As will be seen from Fig. 2, the splines have a trapezoidal configuration so that the parts will be automatically centered relative to each other. It will be noted that whether the teeth have the shape indicated in Fig. 3 or in Fig. 4 there will be a tendency for the shafts to pull together if the inclination of the teeth is properly chosen with reference to the direction of torque transmission, this effect being secured by the inclination of the cooperating surfaces 6. This effect may be made sufficient to hold the parts together even though axial forces indicated by the arrows 8 and 9 be present, tending to pull the connection apart.

It will be noted that the surfaces 7 which come into play upon the occurrence of reverse torque have a higher pitch angle than the co-acting surfaces 6. This will facilitate separation of the parts when needed for disassembly.

Figure 3:
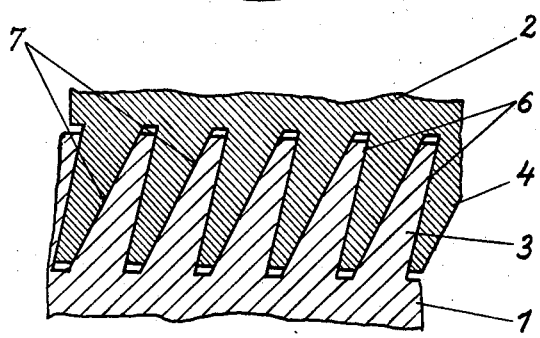
Fig. 3 is a cross-section of the splines along the cylinder indicated by the section line B—B in Fig. 1.
Figure 4:
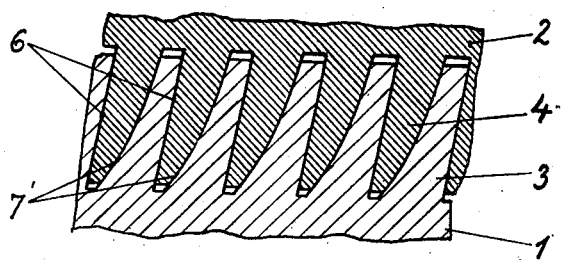
Fig. 4 is a corresponding development with an embodiment of the tooth surfaces different from that in Fig. 3.
Figure 5:
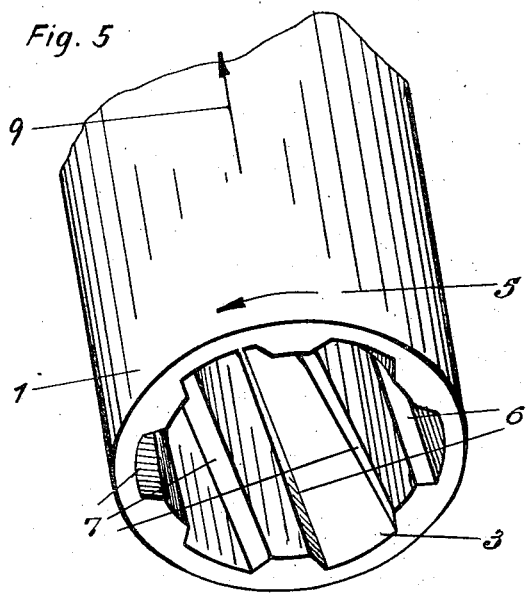
Fig. 5 is a perspective representation of the two shaft elements provided with splines according to the invention.
Figure 5:
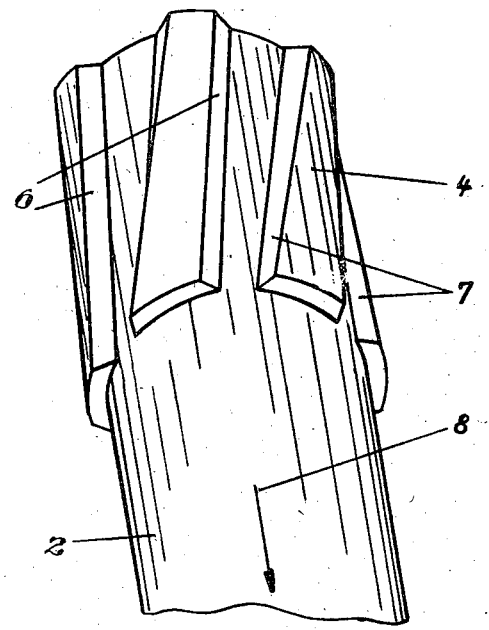

The tooth conformation shown in Fig. 4 differs from that of Fig. 3 in that the normally unloaded co-acting surfaces 7' are curved as seen in the cross-section, with the result that the lead angles of those faces decrease in a direction away from the end of the shaft. The comparatively low lead angle at the base of the teeth assists in the transmission of reverse torque and reduces the force component tending to cause separation of the parts.

Having described several illustrative embodiments of the invention it is pointed out that various changes and modifications therein may be made without departing from the invention as set forth in the following claims:

1. In a releasable splined coupling in which an inner shaft member and an outer encircling member are connected by interengaging spline keys having complemental sides in interfitting engagement, in which the keys on the shaft are peripherally spaced and vary in width along their length, the sides of each key having lead angles of unequal degree in the same direction, each said key being substantially trapezoidal in cross-section in a plane at right angles to the axis of the shaft.

2. In a releasable splined coupling in which an inner shaft member and an outer encircling member are connected by interengaging spline keys having complemental sides in interfitting engagement, in which the keys on the shaft are peripherally spaced and vary in width along their length, the sides of each key having lead angles of unequal degree in the same direction and the lead angles of those faces of the keys which are not loaded in normal operation decrease in a direction away from the end of the shaft, each said key being substantially trapezoidal in cross-section in a plane at right angles to the axis of the shaft.

3. In a releasable splined coupling in which an inner shaft member and an outer encircling member are connected by interengaging spline keys having complemental sides in interfitting engagement, in which the keys on the shaft are peripherally spaced and vary in width along their length, the sides of each key having lead angles of unequal degree in the same direction and the lead angles of those faces of the keys which are not loaded in normal operation decrease in a direction away from the end of the shaft.

PETER BURGER.